United States Patent
Cho et al.

(10) Patent No.: US 7,366,421 B2
(45) Date of Patent: Apr. 29, 2008

(54) SINGLE-TO-MULTI MODE CONVERTER AND OPTICAL CODE DIVISION MULTIPLE ACCESS SYSTEM USING THE SAME

(75) Inventors: Sung-Chan Cho, Daejeon (KR); Bong-Kyu Kim, Daejeon (KR); Young-Hee Yeon, Wonju (KR); Byoung-Whi Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 556 days.

(21) Appl. No.: 10/940,790

(22) Filed: Sep. 13, 2004

(65) Prior Publication Data

US 2005/0141899 A1 Jun. 30, 2005

(30) Foreign Application Priority Data

Dec. 24, 2003 (KR) ............. 10-2003-0096295

(51) Int. Cl.
*H04B 10/08* (2006.01)
*H04B 10/12* (2006.01)

(52) U.S. Cl. .................. 398/142; 398/28; 398/143; 398/144

(58) Field of Classification Search .......... 398/28, 398/30, 31, 39, 43, 47, 48, 50, 141–144
See application file for complete search history.

(56) References Cited

U.S. PATENT DOCUMENTS 5,077,815 A 12/1991 Yoshizawa et al.
5,138,675 A * 8/1992 Schofield .............. 385/28
5,978,528 A 11/1999 Fidric
6,895,146 B1 * 5/2005 Wey et al. ............. 385/39

(Continued)

FOREIGN PATENT DOCUMENTS

JP 09-230151 9/1997
JP 2000-323781 11/2000

(Continued)

OTHER PUBLICATIONS

"A Single method of reducing excess intensity noise in a spectrally encoded optical code-division multiple access network", FP57/ Photonics Conference 2003, pp. 615-616.

(Continued)

*Primary Examiner*—Dalzid Singh
(74) *Attorney, Agent, or Firm*—Blakely, Sokoloff, Taylor & Zafman

(57) ABSTRACT

A single-to-multi mode converter and an optical code division multiple access system using the same. The mode converter includes first, second, and third optical waveguides. The first optical waveguide is formed of a single-mode optical fiber and outputs a single-mode optical signal. The second optical waveguide converts the single-mode optical signal output from the first optical waveguide to a multi-mode optical signal and allows the optical power of the single-mode optical signal to be coupled to each mode of the multi-mode optical signal. The third optical waveguide is formed of a multi-mode optical fiber and transmits the multi-mode optical signal output from the second optical waveguide.

17 Claims, 3 Drawing Sheets

U.S. PATENT DOCUMENTS

2003/0021569 A1* 1/2003 Sidorin ............... 385/132
2003/0072526 A1* 4/2003 Kathman et al. ......... 385/31
2006/0051017 A1* 3/2006 Hallemeier et al. ...... 385/28

FOREIGN PATENT DOCUMENTS

KR  10-2000-0051355 A  8/2000
KR  10-2003-0075301 A  9/2003

OTHER PUBLICATIONS

"Novel Mode Converter BAsed on Hollow Optical fiber for Gigabit LAN Communication", S. Choi, 2002 IEEE, vol. 14, No. 2, Feb. 2002, pp. 248-250.

"An Experimental and Theoretical Study of the Offset Launch Technique for the Enhancement of the Bandwidth of Multimode Fiber Links", Journal of Lightwave TEchnology, vol. 16, No. 3, Mar. 1998, pp. 324-331.

"Reduction of Excess Intensity Noise in Spectrum-Sliced Incoherent Light for WDM Applications", A. Keating, Journal of Lightwave TEchnology, vol. 15, No. 1, Jan. 1997, pp. 53-61.

"1.06um all-fiber gyroscope with noise subtraction", R. Moeller, et al., 3 pages.

* cited by examiner

SINGLE-TO-MULTI MODE CONVERTER AND OPTICAL CODE DIVISION MULTIPLE ACCESS SYSTEM USING THE SAME

CROSS REFERENCE TO RELATED APPLICATION

This application claims priority to and the benefit of Korea Patent Application No. 2003-96295 filed on Dec. 24, 2003 in the Korean Intellectual Property Office, the content of which is incorporated herein by reference.

BACKGROUND OF THE INVENTION (a) Field of the Invention

The present invention relates to a mode converter, and more particularly, to a single-to-multi mode converter that converts a single mode to a multi-mode and a code division multiple access system using the same.

(b) Description of the Related Art

A mode converter is a device that converts modes used in optical communication networks. U.S. Pat. No. 5,077,815 discloses a mode converter, which directly connects a single-mode optical fiber to a multi-mode optical fiber. The mode converter converts a single-mode to a multi-mode through core axial displacement between the single-mode optical fiber and the multi-mode optical fiber. With this mode converter, however, it is very difficult to accurately align the axes of optical fibers with each other according to a designed value to connect the optical fibers to each other. Furthermore, a field distribution of a fundamental mode of the single-mode optical fiber is not suitable for uniformly coupling the power of a fundamental mode of the single-mode optical fiber to each mode of the multi-mode optical fiber during the mode conversion process.

To solve the aforementioned problems, there has been proposed a method that cuts optical fibers that will be connected to each other such that their cross-sections have a specific angle, and then connects the optical fibers to each other. However, the cutting and connecting processes are difficult to carry out. Moreover, it is not easy to decrease errors in the processes.

S. Choi et al. proposed a mode converter using an optical fiber, which is disclosed in an article entitled "Novel mode converter based on hollow optical fiber for Gigabit LAN communication", IEEE Photonics Technology Letters, Vol. 14, No. 2, pp. 248 to 250, 1202. This method connects a tapered hollow optical fiber whose core thickness is gradually increased between a single-mode optical fiber and a multi-mode optical fiber to convert a single mode to a multi-mode. However, this technique couples the power of a fundamental mode of the single-mode fiber to a higher-order mode group having relatively small modal dispersion in order to obtain small modal dispersion. Thus, it is difficult to uniformly couple the power of the fundamental mode of single mode fiber to each mode of multi-mode fiber.

In an optical communication network or an optical access network, excess noise or speckle noise caused by a beat reduces a signal-to-noise ratio to decrease transmission quality and restrict the number of subscribers.

In particular, in the case of an optical access network using code division multiple access, the excess noise is an essential factor that restricts the number of subscribers because the excess noise is in proportion to the square of the number of subscribers. Accordingly, the optical access network requires a technique capable of reducing the excess noise to maximize the number of subscribers.

Noises generated in optical communications include an optical intensity noise that is generated in a laser diode of a transmitter, and a shot noise and a thermal noise generated in a receiver.

In a subcarrier multiplexing optical access network or an optical code-division multiple-access optical access network, signals transmitted from respective subscribers are added up so that an optical signal with a high intensity is received. This generates the excess noise. Particularly, in a spectrally encoded optical CDMA network using a broadband incoherent light source such as a superluminescent light emitting diode as a light source, a large excess noise is generated which restricts the number of subscribers. Furthermore, the performance of an optical fiber gyroscope using the broadband incoherent light source is restricted by the excess noise.

A method of reducing the excess noise caused by a beat is disclosed in U.S. Pat. No. 5,978,528. This method splits a light beam emitted from a light source into a plurality of components using a splitter. Each component travels in a separate path having a unique time delay which is longer than the coherence time of the light source. The lights from separate paths are recombined through a recombiner to be input to a photodetector.

With this technique, the excess noise is reduced as the number of split components is increased. However, an optical loss in the splitter and recombiner is very large during the splitting and recombining process, respectively. Furthermore, this technique should maintain polarization. Moreover, since the split components of the beam should travel through optical fibers of different paths to be recombined, a large number of optical fibers are required to considerably reduce the excess noise.

Furthermore, since the split components that have traveled in separate optical fibers should be recombined with different time delays that are longer than the coherence time, the optical fibers should have different lengths.

Moreover, the method of simply connecting a single-mode optical fiber to a multi-mode optical fiber has very low mode conversion efficiency. In addition, the multi-mode optical fiber must be very long in order to allow adjacent modes to reach the photodetector with different time delays of longer than the coherence time.

SUMMARY OF THE INVENTION

An object of the present invention is to provide a mode converter capable of uniformly coupling the power of a fundamental mode of a single mode optical waveguide to each mode of a multi-mode optical waveguide.

Another object of the present invention is to maximize the number of multiple modes converted from a single mode.

Yet another object of the present invention is to considerably reduce the excess noise in an optical communication network and in optical signal processing using an incoherent light source by using a very simple method.

In one aspect of the present invention, a mode converter includes a first optical waveguide that is formed of a single-mode optical fiber and outputs a single-mode optical signal; a second optical waveguide that converts the single-mode optical signal output from the first optical waveguide to a multi-mode optical signal and allows the optical power of the single-mode optical signal to be uniformly coupled to each mode of the multi-mode optical signal; and a third optical waveguide that is formed of a multi-mode optical fiber and transmits the multi-mode optical signal output from the second optical waveguide.

The second optical waveguide is a mode scrambler.

The optical power of the single-mode optical signal is uniformly coupled to each mode of the multi-mode optical signal by controlling a period and size of mechanical protrusions and depressions formed in the mode scrambler.

The second optical waveguide is a tapered optical fiber.

The core of the tapered optical fiber has a multi-step refractive index distribution or a multi-graded refractive index distribution such that the power of the single mode optical signal is uniformly coupled to each mode of the multi-mode optical signal.

The number of modes of the multi-mode optical signal output from the tapered optical fiber is identical to the number of modes of the multi-mode optical fiber.

The multi-mode optical fiber has a large modal dispersion such that a difference between the instants of time of arrival of adjacent order modes at the end of the optical fiber is longer than the coherent time of an incoherent light source.

A time difference between signals when the signals arrive at the end of the multi-mode optical fiber respectively in the fundamental mode and the highest-order mode of the multi-mode optical fiber is shorter than a modulation rate such that the time difference does not affect signal distortion.

The multi-mode optical fiber is a dispersion-shifted optical fiber that has a large difference between the refractive indexes of the core and cladding thereof, the dispersion-shifted optical fiber having a step refractive index distribution, a multi-step refractive index distribution, or a multi-graded refractive index distribution.

The first, second, and third optical waveguides are integrated on a single substrate.

The first, second, and third optical waveguides are formed using flip-chip bonding.

The first, second, and third optical waveguides are connected using fusion splicing.

In another aspect of the present invention, a balance detector of an optical code division multiple access system includes a Bragg grating that reflects an optical signal having a specific wavelength among optical signals input thereto and transmits the other optical signal; a first mode converter that converts the optical signal transmitted by the Bragg grating to a multi-mode optical signal; a second mode converter that converts the optical signal reflected by the Bragg grating to a multi-mode optical signal; and photodetectors that respectively convert the multi-mode optical signals output from the first and second mode converter to electric signals.

The first mode converter includes a first optical waveguide that transmits the optical signal transmitted by the Bragg grating, a second optical waveguide that converts a single-mode optical output from the first optical waveguide to a multi-mode optical signal, and a third optical waveguide that transmits the multi-mode optical signal, and the second mode converter includes a first optical waveguide that transmits the optical signal reflected by the Bragg grating, a second optical waveguide that converts a single-mode optical output from the first optical waveguide to a multi-mode optical signal, and a third optical waveguide that transmits the multi-mode optical signal.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
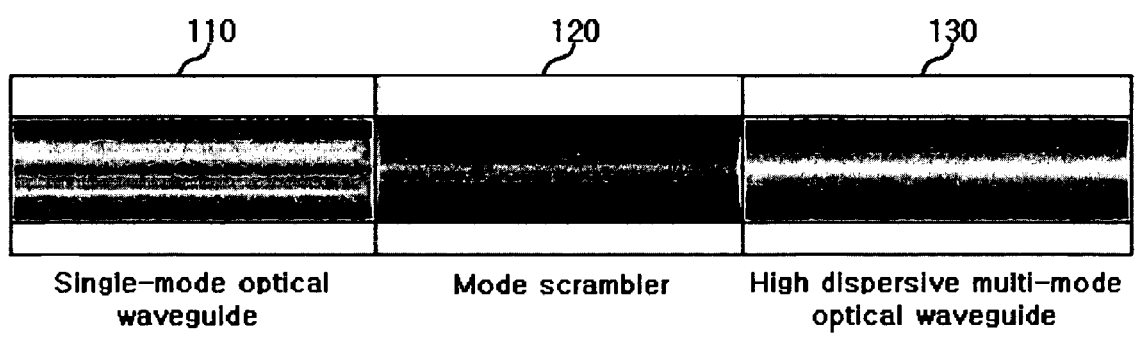
FIG. 1 illustrates a mode converter according to a first embodiment of the present invention.

FIG. 1 illustrates a mode converter according to a first embodiment of the present invention. Referring to FIG. 1, the mode converter according to the first embodiment of the present invention includes a single-mode optical waveguide 110, a mode scrambler 120, and a multi-mode optical waveguide 130.

The single-mode optical waveguide 110 is formed of a single-mode optical fiber, and the multi-mode optical waveguide 130 is formed of a high dispersion multi-mode optical fiber. Accordingly, the mode converter can be easily manufactured and connection loss and insertion loss can be remarkably reduced.

Furthermore, the mode converter according to the first embodiment of the present invention can be integrated on a signal substrate, and it can be formed using flip-chip bonding. More effectively, the mode converter can be fabricated by fusion-splicing the single-mode optical waveguide 110, the mode scrambler 120, and the multi-mode optical waveguide 130.

The mode scrambler 120 connects the single-mode optical waveguide 110 to the multi-mode optical waveguide 130, and converts a single-mode optical signal output from the single-mode optical waveguide 110 to a multi-mode optical signal to output the multi-mode optical signal to the multi-mode optical waveguide 130. The mode scrambler 120 is periodically pressed from the top and bottom such that it has mechanical protrusions and depressions (not shown). When the period and size of the mechanical protrusions and depressions are appropriately controlled, the optical power of the fundamental mode of the single-mode optical waveguide 110 can be uniformly coupled to each mode of the multi-mode optical waveguide 120.

That is, in the case where the multi-mode optical waveguide 130 has low-order to high-order modes, the mode scrambler 120 is formed such that optical power intensity is uniformly distributed in the lowest-order mode to the highest-order mode.

According to the first embodiment of the present invention, the multi-mode optical waveguide has the maximum number of guided modes in the optical fiber. In addition, the multi-mode optical waveguide has large modal dispersion so that a difference between the instants of time of arrival of a mode order i and a mode order i+1 is longer than the coherence time of an incoherent light source.

Specifically, the multi-mode optical waveguide 130 uses an optical fiber with a step refractive index distribution, which has a large refractive index difference between a core and a cladding, or a dispersion-shifted optical fiber having a multi-step refractive index distribution, a multi-graded index distribution, or an index distribution using the multi-step index distribution and the multi-graded index distribution such that the multi-mode optical waveguide 130 obtains very large modal dispersion.

Figure 2:
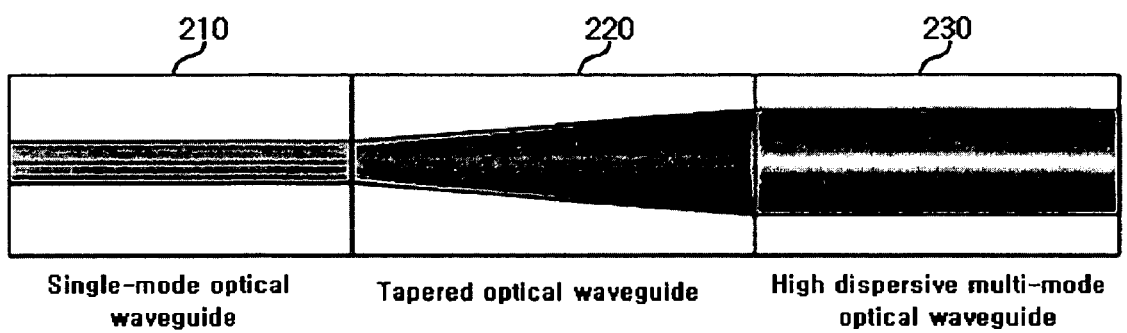
FIG. 2 illustrates a mode converter according to a second embodiment of the present invention.

FIG. 2 shows a mode converter according to a second embodiment of the present invention. Referring to FIG. 2, the mode converter according to the second embodiment of the present invention includes a single-mode optical waveguide 210, a tapered optical waveguide 220, and a multi-mode optical waveguide 230.

When the tapered optical waveguide 220 is used to connect the single-mode optical waveguide 210 to the multi-mode optical waveguide 230, a core index distribution is controlled to be identical to a multi-quantum-well structure so that a field distribution of the fundamental mode becomes similar to a field distribution of a higher-order mode. Accordingly, mode matching between the fundamental mode and the higher-order mode is improved so that the power of the fundamental mode of the single-mode optical waveguide 210 can be uniformly transmitted to low-order to high-order modes of the multi-mode optical waveguide 230.

According to an embodiment of the present invention, the tapered optical waveguide 220 is constructed in a manner such that an optical fiber core has a multi-step refractive index distribution or a multi-graded refractive index distribution, identical to the multi-quantum-well structure, to make the photoelectric field distribution of the fundamental mode similar to an electric field distribution of a higher-order mode of the multi-mode optical fiber. Accordingly, over-filled mode conversion can be obtained.

The above-described mode converter according to the present invention can be used to reduce the excess intensity noise in an optical communication network or optical signal processing using an incoherent light source.

A balance detector of an optical code division multiple access network using the mode converter according to the present invention will now be explained.

Figure 3:
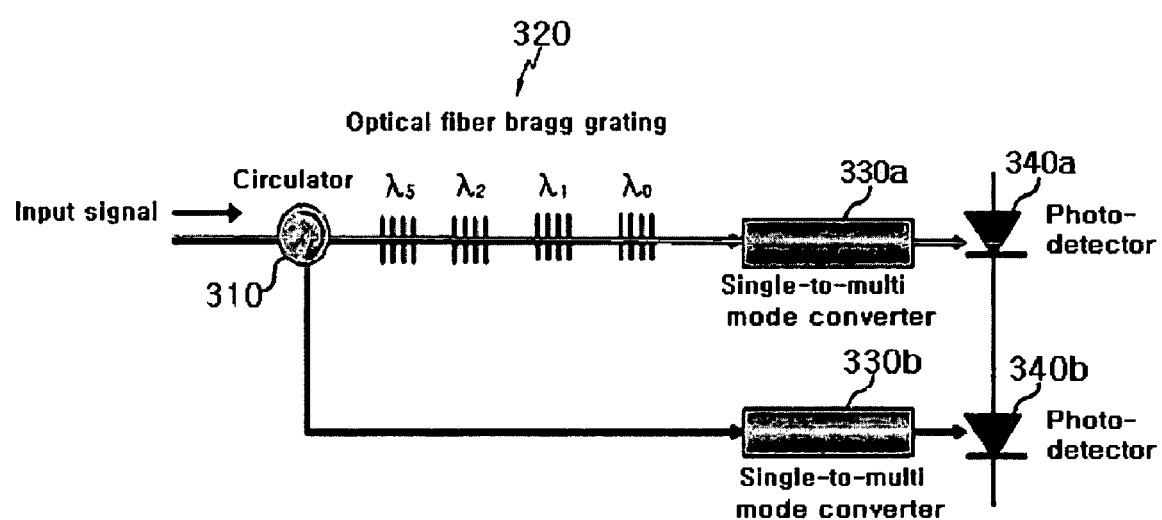
FIG. 3 illustrates a balanced detector of an optical code division multiple access network using the mode converter according to an embodiment of the present invention.

FIG. 3 illustrates a balance detector of an optical code division multiple access network using the mode converter according to the present invention. Referring to FIG. 3, the balanced detector includes a circulator 310, an optical fiber Bragg grating 320, single-to-multi mode converters 330a and 330b, and photodetectors 340a and 340b.

The circulator 310 outputs an input signal to the optical fiber Bragg grating 320 and outputs a signal reflected from the optical fiber Bragg grating 320 to the single-to-multi mode converter 330b.

Specifically, the optical fiber Bragg grating 320 reflects a frequency component of the input signal, whose effective wavelength is identical to Bragg wavelength of the optical fiber Bragg grating 320, to the circulator 310. The mode converter 330a converts a single-mode signal transmitted from the optical fiber Bragg grating 320 to a multi-mode optical signal to output it to the photodetector 340a. The mode converter 330b converts a signal transmitted from the circulator 310 to a multi-mode optical signal to output it to the photodetector 340b. The photodetectors 340a and 340b convert the multi-mode optical signals to electric signals.

Digital data '0' is coded into wavelengths corresponding to the complimentary signature of '1' and transmitted to a receiving end, as shown in FIG. 3, in an optical code division multiple access network, and this signal passes through the optical Bragg grating 320 and the mode converters 330a and 330b to be detected by the photodetectors 340a and 340b.

Specifically, when the code of the signal corresponds to a code of the Bragg grating 320, the detector 340a or detector 340b detects the code to generate output values '1' and '−1'. When the code of the signal is not identical to the code of the Bragg grating 320, the output of the optical pulse of the signal is branched in two and the resultant outputs are respectively input to the detectors 340a and 340b, to generate an output value '0'. That is, only the signal of a corresponding user, whose code corresponds to the code of the Bragg grating, is recognized, and a signal of a user who simultaneously uses the network, whose code is different from the code of the Bragg grating, is cancelled.

To effectively reduce the excess intensity noise, the mode converters 330a and 330b are constructed such that they satisfy the following conditions.

First of all, the mode converters 330a and 330b must convert an input single-mode signal to the maximum number of modes having uniform mode power. Furthermore, multi-mode optical waveguides of the mode converters 330a and 330b should have a very large modal dispersion such that an ith order mode and an (i+1)th order mode are arrived at the ends of the mode converters having a time difference between them which is longer than the coherence time of a light source even when the modes are propagated in a short distance.

Moreover, the multi-mode optical waveguides must be designed such that they approximate an ideal structure to hinder the mode coupling. Furthermore, a time difference between the fundamental mode and highest-order mode when the modes arrive at the ends of the mode converters must be smaller than a modulation rate to result in no signal distortion.

Since a higher-order mode has a larger diffraction angle than a lower-order mode, most of the power of the higher-order mode is not detected when a detecting area of a photodetector is small or a lens size and a distance between the optical fiber and the photodetector is not optimized.

Accordingly, a photodetector having a sufficiently large detecting area must be used. A lensed multi-mode optical fiber can be used for a pigtail. Furthermore, a lens having a sufficiently large diameter is used between the optical fiber and the photodetector, and a distance between the multi-mode optical fiber and the lens and a distance between the lens and the photodetector should be as small as possible. According to the present invention, the power of the fundamental mode of the single-mode optical waveguide can be uniformly coupled to each mode of the multi-mode optical waveguide when a single mode is converted to a multi-mode. This enables overfilled mode conversion in lower-order to higher-order modes of the multi-mode. That is, uniform overfilled mode conversion can be obtained by controlling a refractive index profile of the tapered optical waveguide. To accomplish more effective overfilled mode conversion, the mode scrambler can be used, or a tapered mode converter can replace the mode scrambler.

According to the present invention, a time difference between the ith order mode and the (i+1)th order mode of an optical signal output from a mode converter can be longer than the coherence time of a light source. Though a conventional step-index or graded index multi-mode fiber should be very long because it has small dispersion, the multi-mode optical waveguide according to the present invention can use a very short optical fiber.

Furthermore, the number of multiple modes converted from a single-mode can be maximized. Accordingly, the maximum number of multiple modes can be obtained by using an optical fiber whose core diameter is several times the core diameter of a conventional multi-mode optical fiber, or an optical fiber having a large refractive index difference between the core and cladding.

Moreover, the excess intensity noise can be reduced by more than 20 dB in an optical communication network or in optical signal processing using a broadband incoherent light source when the mode converter of the present invention is used. Specifically, the mode converter is arranged right before a photodetector such that modes having non-correlation are input to the photodetector so as to remarkably reduce the excess intensity noise.

Moreover, it is possible to considerably reduce the excess intensity noise in the optical communication network and optical signal processing using an incoherent light source with a simple method using the mode converter of the present invention.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A mode converter comprising:
   a first optical waveguide that is formed of a single mode optical fiber and outputs a single-mode optical signal;
   a second optical waveguide that converts the single-mode optical signal output from the first optical waveguide to a multi-mode optical signal and allows the optical power of the single-mode optical signal to be coupled to each mode of the multi-mode optical signal; and
   a third optical waveguide that is formed of a multi-mode optical fiber and transmits the multi-mode optical signal output from the second optical waveguide,
   wherein a time difference between signals when the signals arrive at the end of the multi-mode optical fiber respectively in the fundamental mode and the highest-order mode of the multi-mode optical fiber is shorter than a modulation rate such that the time difference does not affect signal distortion.

2. The mode converter as claimed in claim 1, wherein the second optical waveguide is a mode scrambler.

3. The mode converter as claimed in claim 2, wherein the optical power of the single-mode optical signal is coupled to each mode of the multi-mode optical signal based on a period and size of mechanical protrusions and depressions formed in the mode scrambler.

4. The mode converter as claimed in claim 1, wherein the second optical waveguide is a tapered optical fiber.

5. The mode converter as claimed in claim 4, wherein the core of the tapered optical fiber has a multi-step refractive index distribution or a multi-graded refractive index distribution such that the power of the single-mode optical signal is coupled to each mode of the multi-mode optical signal.

6. The mode converter as claimed in claim 4, wherein the number of modes of the multi-mode optical signal output from the tapered optical fiber substantially corresponds to the number of modes of the multi-mode optical fiber.

7. The mode converter as claimed in claim 1, wherein the multi-mode optical fiber has a large modal dispersion such that a difference between the instants of time of arrival of adjacent order modes at the end of the optical fiber is longer than the coherent time of an incoherent light source.

8. The mode converter as claimed in claim 1, wherein the multi-mode optical fiber is a dispersion-shifted optical fiber that has a large difference between the refractive indexes of the core and cladding thereof, the dispersion-shifted optical fiber having one of a step refractive index distribution, a multi-step refractive index distribution, and a multi-graded refractive index distribution.

9. The mode converter as claimed in claim 1, wherein the first, second, and third optical waveguides are integrated on a single substrate.

10. The mode converter as claimed in claim 1, wherein the first, second, and third optical waveguides are formed using flip-chip bonding.

11. The mode converter as claimed in claim 1, wherein the first, second, and third optical waveguides are connected using fusion splicing.

12. An optical code-division multiple-access system including a balanced detector, the balanced detector comprising:
    a Bragg grating that reflects an optical signal having a specific wavelength among optical signals input thereto and transmits the other optical signal;
    a first mode converter that converts the optical signal transmitted by the Bragg grating to a multi-mode optical signal;
    a second mode converter that converts the optical signal reflected by the Bragg grating to a multi-mode optical signal; and
    photodetectors that respectively convert the multi-mode optical signals output from the first and second mode converter to electric signals,
    wherein the first mode converter includes a first optical waveguide that transmits the optical signal transmitted by the Bragg grating, a second optical waveguide that converts a single-mode optical output from the first optical waveguide to a multi-mode optical signal, and a third optical waveguide that transmits the multi-mode optical signal, and the second mode converter includes a first optical waveguide that transmits the optical signal reflected by the Bragg grating, a second optical waveguide that converts a single-mode optical output from the first optical waveguide to a multi-mode optical signal, and a third optical waveguide that transmits the multi-mode optical signal.

13. The optical code division multiplex access system as claimed in claim 12, wherein the first optical waveguide is formed of a single-mode optical fiber and the second optical waveguide is formed of a multi-mode optical fiber.

14. The optical code division multiplex access system as claimed in claim 12, wherein the second optical waveguide couples the optical power of the optical signal propagated in the first optical waveguide to each mode of the third optical waveguide.

15. The optical code division multiplex access system as claimed in claim 14, wherein the second optical waveguide is a mode scrambler, and each of the first and second mode converters uniformly couple the optical power of the optical signal of the first optical waveguide to each mode of the third optical waveguide based on a period of size of mechanical protrusions and depressions formed in the mode scrambler.

16. The optical code division multiplex access system as claimed in claim 14, wherein the second optical waveguide is a tapered optical fiber, and the core of the tapered optical fiber has one of a step refractive index distribution, a multi-step refractive index distribution, and a refractive index distribution using the step distribution and multi-step distribution such that the optical power of the optical signal of the first optical waveguide is coupled to each mode of the third optical waveguide.

17. The optical code division multiplex access system as claimed in claim 12, wherein the third optical waveguide is formed of a multi-mode optical fiber, and the multi-mode optical fiber has a large modal dispersion such that a difference between the instants of time of arrival of adjacent order modes at the end of the optical fiber is longer than the coherent time of an incoherent light source.

* * * * *